J. W. UNGER AND H. LAHANN.
HOG FEEDER.
APPLICATION FILED OCT. 4, 1919.
1,355,435.
Patented Oct. 12, 1920.
2 SHEETS—SHEET 1.
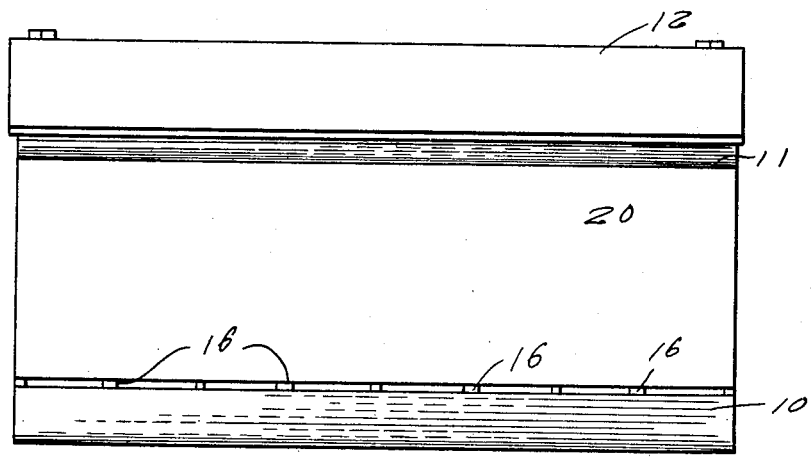
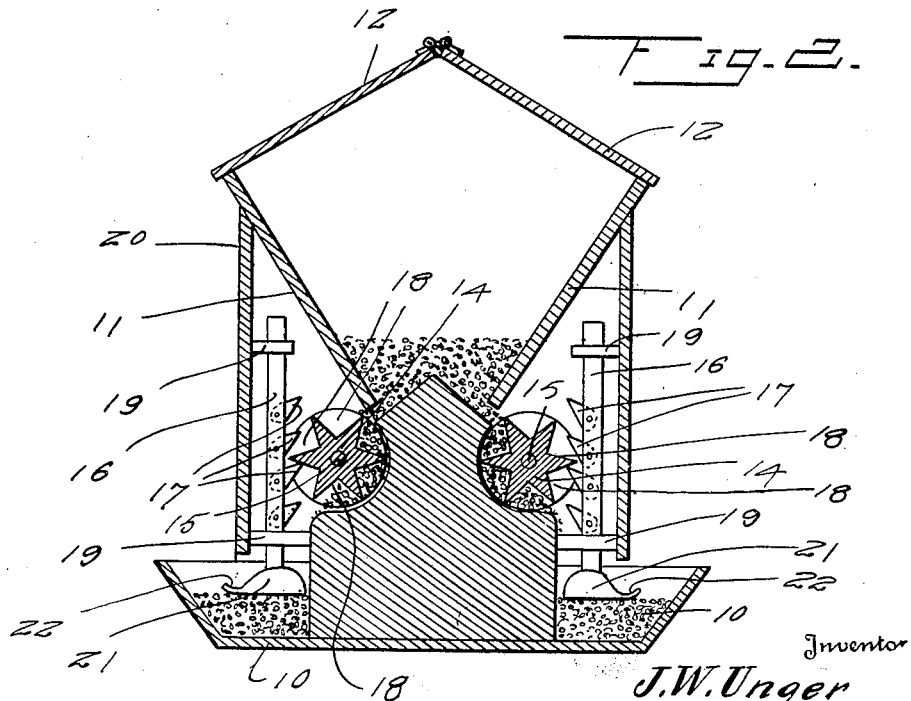
Inventor
J.W. Unger
H. Lahann
By Thomas R. Harney
Attorney J. W. UNGER AND H. LAHANN
HOG FEEDER.
APPLICATION FILED OCT. 4, 1919.
1,355,435.
Patented Oct. 12, 1920.
2 SHEETS—SHEET 2.
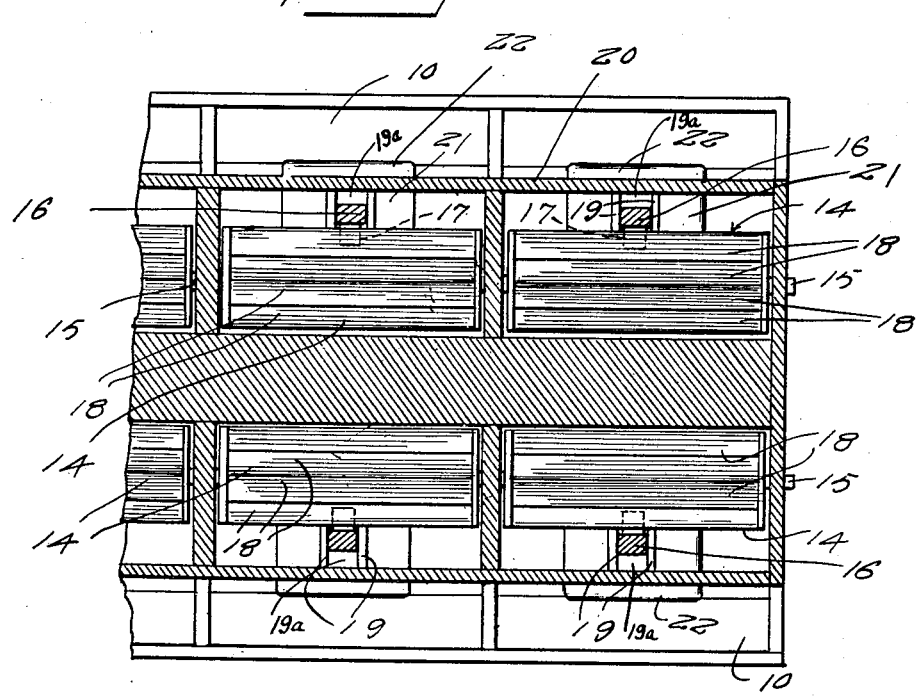
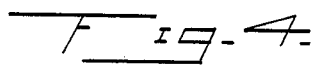
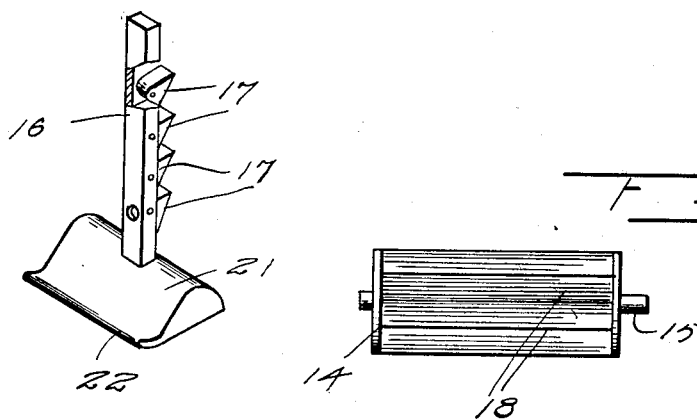
Inventor
J. W. Unger
H. Lahann.
By Thomas H. Thomas
Attorney

UNITED STATES PATENT OFFICE.

JOHN W. UNGER AND HERMAN LAHANN, OF CORRECTIONVILLE, IOWA, ASSIGNORS TO FARM SPECIALTY MANUFACTURING COMPANY, OF ST. JAMES, MINNESOTA, A CORPORATION OF MINNESOTA.

HOG-FEEDER.

1,355,435.      Specification of Letters Patent.      Patented Oct. 12, 1920.

Application filed October 4, 1919. Serial No. 328,355.

*To all whom it may concern:*

Be it known that we, JOHN W. UNGER and HERMAN LAHANN, citizens of the United States of America, residing at Correctionville, in the county of Woodbury and State of Iowa, have invented certain new and useful Improvements in Hog-Feeders, of which the following is a specification.

Our present invention relates generally to hog feeders, and is more particularly an improved animal actuated feed control, the purpose of which is to avoid over-feeding and waste.

It is a well known fact that in connection with hog feeders as now used, those employing animal actuated feeders are objectionable on account of the fact that no practical limit is placed upon animal actuation of the parts and as a consequence over-feeding of grain takes place with considerable waste.

Our invention avoids the above difficulties by placing a check upon the animal actuation of the parts so as to prevent operation of the animal actuated parts until the feeding trough is partially or wholly emptied.

In the accompanying drawings illustrating our present invention;

Figure 1 is a side elevation,

Fig. 2 is a vertical cross section,

Fig. 3 is a horizontal section,

Fig. 4 is a detail perspective view of one of the ratchet bars,

Fig. 5 is a detail plan view of one of the rollers or drums.

Referring now to these figures, our invention is for use with that type of hog feeders having one or more troughs 10 and an upper casing 11, whose interior forms the grain space, provided with hinged lids 12. At the lower side portions of the casing 11, the grain feeds outwardly into the troughs through the feed slots 13 under control of rotating drums or rollers 14, each of which is revolubly mounted upon a shaft 15 above its respective compartment of the feed troughs 10 and has lengthwise channeled ribs into which the grain falls through the feed slots 13.

Disposed opposite each of the rollers or drums 14, above the inner portion of each of the feed compartments of the troughs 10, is a vertically movable ratchet bar 16 having a vertical series of pivoted teeth 17 projecting therefrom and so arranged as to yield away from the channeled ribs 18 of the roller 14 when the ratchet bar moves downwardly and to engage these ribs and rotate the roller when the ratchet bar is moved upwardly.

Each ratchet bar 16 moves in bearing members or guides 19 having spacing blocks 19$^a$ carried by a wall 20 and has at its lower end a transverse plate depending within the respective feed compartment of the troughs 10 to rest upon the surface of the grain therein. The forward or outer edge of this plate 21 of each ratchet bar which forms in effect a float, is provided with a curved lip 22, and this lip is engaged by the animal to lift the ratchet bar and bring about the grain feeding operation. The presence of the float at the lower end of each ratchet bar prevents the ratchet bar from dropping downwardly and in this way permitting of repeated working strokes, so that it is necessary for the animal or animals to at least partially exhaust the contents of the feed compartments before the ratchet bar lowers to an extent which will shift the lowermost of its teeth 17 below one of the channeled ribs 18 of the roller 14.

In this way, by the simple addition used in the operating parts proposed by our invention, we overcome the present difficulties first above mentioned without either complicating the feeder to any undesirable extent or adding materially to its cost of production.

We claim:—

1. In a hog feeder including a feed trough and a grain magazine, together with a roller having channeled peripheral ribs and arranged to control the feeding of grain from the said magazine to the feed trough, a vertically movable ratchet bar having pivoted ratchet teeth for engagement with the ribs of the said roller when the bar is moved upwardly and yieldable with respect to the roller when the bar moves downwardly, said bar having means at its lower end arranged to contact with the grain in the feed trough and prevent lowering movement of the ratchet bar, except as the grain in the feed trough is exhausted.

2. In an animal actuated feeder, including a feed trough, a grain magazine from which grain is discharged into the trough, a feed roller controlling the feed of grain from the magazine, a vertically shiftable ratchet bar arranged to rotate said feed roller upon upward movement of the bar and to yield with respect thereto when the bar moves downwardly, and a plate arranged at the lower end of the ratchet bar within the feed trough for contact with the grain to control lowering movement of the said ratchet bar in accordance with the fall of the grain level in the feed trough.

3. In a feeding device of the character described having a feed trough, a grain magazine and feed controlling means for controlling the discharge of grain to the trough, including a feed roller and a vertically shiftable ratchet bar having means yieldable with respect to the feed roller when the bar moves downwardly and arranged to actuate the feed roller when the bar is moved upwardly, the lower end of which ratchet bar depends into the feed trough, a plate at the lower end of the said ratchet bar forming a float to arrest lowering movement of the ratchet bar under control of the grain level in the feed trough, said plate having an outwardly curved lip as and for the purpose set forth.

In testimony whereof we affix our signatures.

JOHN W. UNGER.
HERMAN LAHANN.